United States Patent
Aoki

(10) Patent No.: US 6,772,507 B2
(45) Date of Patent: Aug. 10, 2004

(54) METHOD OF MANUFACTURING MAGNETIC RECORDING MEDIUM

(75) Inventor: Masashi Aoki, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 250 days.

(21) Appl. No.: 09/949,819

(22) Filed: Sep. 12, 2001

(65) Prior Publication Data

US 2002/0029460 A1 Mar. 14, 2002

(30) Foreign Application Priority Data

Sep. 12, 2000 (JP) ........................................ 2000-275837

(51) Int. Cl.⁷ .......................... G11B 5/127; H04R 31/00
(52) U.S. Cl. ................. 29/603.16; 29/603.07; 29/603.08; 29/603.09; 29/606; 83/684; 83/685; 83/686; 83/948; 360/133; 360/135; 451/41; 451/54; 451/63
(58) Field of Search .......................... 29/603.07, 603.08, 29/603.09, 603.16, 606; 83/684–691, 948; 360/77.11, 97.02, 97.04, 132, 133, 135; 451/41, 54, 63

(56) References Cited

U.S. PATENT DOCUMENTS

| | | | | |
|---|---|---|---|---|
| 5,023,738 A | * | 6/1991 | Prenosil | ...................... 360/122 |
| 5,183,479 A | * | 2/1993 | Grimes | ......................... 51/293 |
| 5,341,606 A | * | 8/1994 | Hirabayashi | .................. 451/41 |
| 5,486,276 A | * | 1/1996 | Kitamoto et al. | ......... 204/192.2 |
| 5,991,104 A | | 11/1999 | Bonyhard | |
| 6,113,753 A | * | 9/2000 | Washburn | ............... 204/192.15 |
| 6,587,289 B2 | | 7/2003 | Nishikawa et al. | |

| | | | | |
|---|---|---|---|---|
| 2002/0150794 A1 | | 10/2002 | Hamada et al. | |

FOREIGN PATENT DOCUMENTS

| | | | | |
|---|---|---|---|---|
| EP | 0 915 456 A1 | 5/1999 | ............ | G11B/5/86 |
| EP | 1 251 495 A2 | 10/2002 | | |
| JP | 63-183623 | 7/1988 | ............ | G11B/5/86 |
| JP | 10162361 A | * 6/1998 | ............ | G11B/5/86 |
| JP | 10-269566 | 10/1998 | ............ | G11B/5/84 |
| JP | 10-40544 | 8/1999 | ............ | A47J/27/00 |

OTHER PUBLICATIONS

"Theory of antiferromagnetically coupled magnetic recording media"; Schabes, M.E.; Fullerton, E.E.; Margulies, D.T.; Magnetic IEEE Transactions on , vol.: 37, Issue: 4, Jul. 2001 pp.: 1432–1434.*

Patent Abstract of Japan 63–183623 Jul. 29, 1988.

* cited by examiner

*Primary Examiner*—A. Dexter Tugbang
*Assistant Examiner*—Paul Kim
(74) *Attorney, Agent, or Firm*—Sughrue Mion, PLLC

(57) ABSTRACT

A method of manufacturing a magnetic recording medium having a disc-shaped flexible slave medium accommodated in a case, onto which servo signals are effectively recorded by a magnetic transfer method with high quality. The method includes a slitting step for cutting an original sheet into discrete webs; a punching step for obtaining a disc-shaped slave medium; a thermo step for removing distortion; a burnishing step for smoothing a surface of the slave medium; a center core attachment step; a magnetic transfer step for performing a magnetic transfer while a master medium is allowed to be brought into close contact with one of the web and the slave medium; an assembly step for incorporating slave medium into the case; a cleaning step for cleaning a surface of the slave medium; a verifying step for checking the servo signals; and a packing step.

9 Claims, 4 Drawing Sheets

F I G. 6A
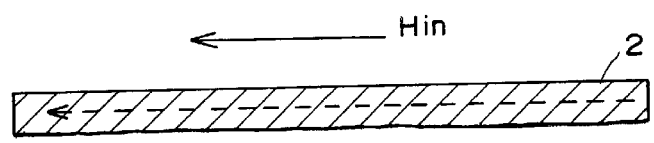
F I G. 6B
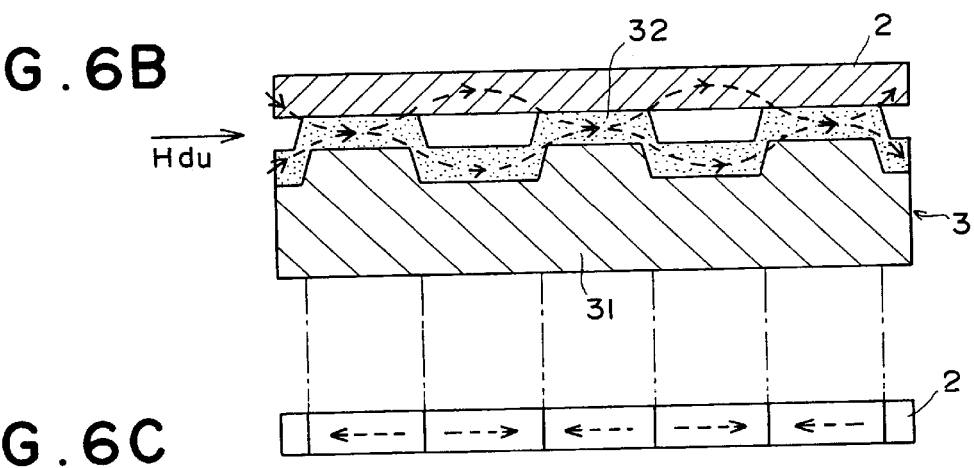
F I G. 6C
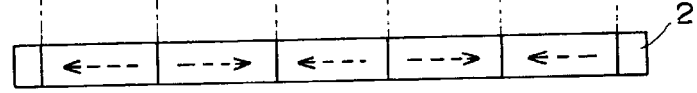

METHOD OF MANUFACTURING MAGNETIC RECORDING MEDIUM

BACKGROUND OF THE INVENTION

1. Field of the Invention

The present invention relates to a method of manufacturing a magnetic recording medium having a disc-shaped flexible slave medium accommodated in a case, onto which servo signals are recorded by a magnetic transfer method.

2. Description of the Prior Art

To realize large recording capacity of a magnetic recording medium having a disc-shaped flexible slave medium accommodated in a case, which is a so-called flexible disc, so-called tracking servo technology for reproducing signals with a high S/N ratio by scanning tracks with a narrow width precisely by means of a magnetic head has played an important part.

Servo signals for tracking, address information signals, reproducing clock signals and the like are previously recorded on one circumferential track at certain intervals in the slave medium (hereinafter referred to as a servo write), and a magnetic head reads the signals to correct its own position, whereby the magnetic head can trace the track accurately.

The existing servo write is prepared by recording the signals one track by one track for each slave medium by use of a servo write apparatus exclusively used for that purpose. Recording capacity has a tendency to be highly densified, and the servo write take a long time. For this reason, a servo write step occupies a large part of the manufacturing cost, and lowering of the cost is desired.

In view of the above described circumstances, conceived is a technology concerning a magnetic transfer method in which the servo write is not carried out one track by one track, but carried out simultaneously for the entire surface of the slave medium. In this magnetic transfer method, magnetic field for transfer (hereinafter referred to as transfer magnetic field) is applied to a master medium and the slave medium in a state where both of the mediums are brought into close contact with each other, and thus a magnetic pattern corresponding to information such as servo signals borne on the master medium is magnetically transferred to the slave medium. As to this magnetic transfer method, disclosures have been made in, for example, Japanese Unexamined Patent Publication Nos. 63(1988)-183623, 10(1998)-40544, 10(1998)-269566 and the like.

In the manufacturing steps for manufacturing the magnetic recording medium including the magnetic transfer, a measure to cope with demands for securement of a recording accuracy of the servo signals, securement of quality and the like is necessary. Therefore, removing distortion of the material, increasing flatness of the disc, removal of dust, checking and the like must be carried out. Moreover, a manufacturing system must be constructed by effectively carrying out these processe.

SUMMARY OF THE INVENTION

The present invention was made in consideration of such circumstances, and the object of the present invention is to provide a method of manufacturing a magnetic recording medium capable of having a disc-shaped flexible slave medium accommodated in a case, onto which servo signals are recorded with high quality and efficiency by a magnetic transfer method.

A method of manufacturing a magnetic transfer medium of the present invention, which has a disc-shaped flexible slave medium accommodated in a case, onto which servo signals are recorded by a magnetic transfer method, comprises the steps of: cutting an original sheet into discrete webs, each having a predetermined width (slitting step); obtaining a disc-shaped slave medium by punching the web (punching step); removing distortion of the web or the slave medium (thermo step); smoothing a surface of the slave medium (burnishing step); fixedly attaching a center core to the slave medium (center core attachment step); performing a magnetic transfer while allowing a master medium bearing servo information and one of the web and the slave medium to be brought into close contact with each other (magnetic transfer step); incorporating the slave medium into the case (assembly step); removing dust on the slave medium after completion of the assembly step (cleaning step); checking the servo signals magnetically transferred to the slave medium (verifying step); and packing the magnetic recording medium as a product (packing step).

The method of manufacturing a magnetic recording medium preferably comprises the slitting step, the punching step, the thermo step, the burnishing step, the center core attachment step, the magnetic transfer step, the assembly step, the cleaning step, the verifying step and the packing step in this order.

The magnetic transfer step should be carried out in such a manner that the slave medium is first subjected to DC magnetization in a track direction, the slave medium is allowed to be brought into close contact with the master medium for use in the magnetic transfer, on which a magnetic layer is formed in a micro uneven pattern corresponding to information to be transferred, and a transfer magnetic field is applied to the master medium and the slave medium in a direction approximately reverse to the initial DC-magnetization direction for a surface of the slave medium.

According to the present invention as described above, the method of manufacturing a magnetic recording medium comprises the slitting step, the punching step, the thermo step, the burnishing step, the center core attachment step, the magnetic transfer step, the assembly step, the cleaning step, the verifying step and the packing step, whereby it is possible to manufacture the magnetic recording medium having the disc-shaped flexible slave medium accommodated in a case, onto which servo signals are recorded with high efficiency and high quality.

The method of manufacturing a magnetic recording medium which comprises the above-described step in this order can cope with demands for an increase in quality and efficiency of manufacturing the same.

BRIEF DESCRIPTION OF THE DRAWINGS

FIGS. 6A to 6C are diagrams showing a magnetic transfer method according to one embodiment of the present invention.

DETAILED DESCRIPTION OF THE PREFERRED EMBODIMENTS

Embodiments of the present invention will be described with reference to the accompanying drawings in detail below. FIGS. 1 to 5 are diagrams showing flows of manufacturing steps for manufacturing a magnetic recording medium of first to fifth embodiments of the present invention respectively.

Figure 1:
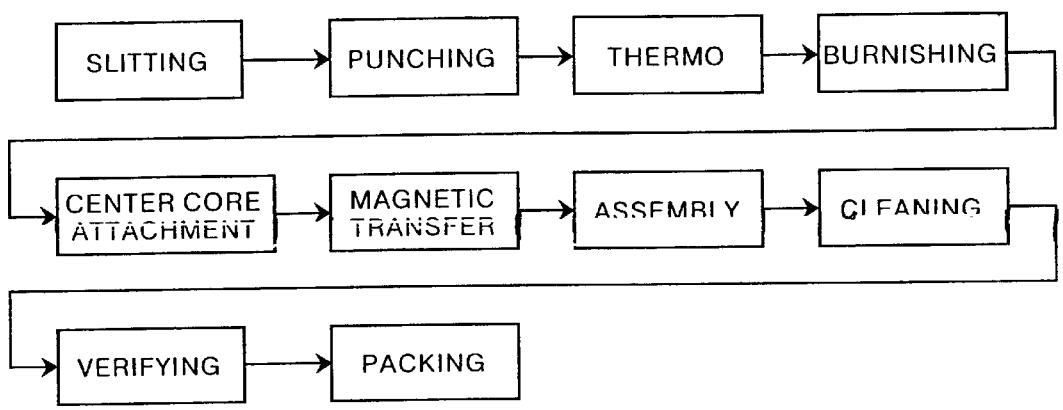
FIG. 1 is a diagram showing a flow of manufacturing steps for manufacturing a magnetic recording medium according to a first embodiment of the present invention.

FIG. 1 shows manufacturing steps for manufacturing a magnetic recording medium according to the first embodiment, in order. A first step is a slitting step for cutting an original sheet into discrete webs, each having a predetermined width, in which a slitter (cutting machine) having a slit edge slits a roll of original sheet with a large width into the discrete webs each having a predetermined width, and the webs are wound. A second step is a punching step for obtaining the disc-shaped slave medium by punching the web, in which a press machine having a punch and a die punches the web to obtain the disc-shaped slave medium having a hole for attaching a center core in the center thereof. A third step is a thermo step for removing distortion of the slave medium, in which the distortion of the slave medium is removed by placing the slave medium in a constant temperature bath adjusted to a predetermined temperature. The thermo step also has a function to promote hardening of the slave medium. A fourth step is a burnishing step for smoothing a surface of the slave medium, in which micro protrusions in the surface of the slave medium are scraped and the surface thereof is smoothed by a hard material such as a grinding head and a rotation edge, a polishing tape, nonwoven fabric or the like and then stains and excessive lubricant on the surface of the slave medium are removed. A fifth step is a center core attachment step for fixedly attaching a center core to the slave medium, in which an outer peripheral flange portion of the center core made of a metallic plate and an inner peripheral portion of the slave medium are fixedly attached to each other by adhesive or the like so that both centers thereof are matched with each other. A sixth step is a magnetic transfer step for performing a magnetic transfer by allowing the slave medium and a master medium bearing servo information to be brought into close contact with each other, and this step is described in detail later using FIG. 6. A seventh step is an assembly step for incorporating the slave medium after the magnetic transfer into the case, in which the slave medium, a liner and other parts are incorporated, the case being composed of a lower shell and an upper shell having a window portion for inserting a magnetic head, the upper and lower shells are tightened, and a shutter to open and close the window portion is attached, thus completing the magnetic recording medium. An eighth step is a cleaning step for removing dust on the slave medium after assembly, in which the window portion is opened by an opening operation of the shutter and stains such as dust adhered to the slave medium are removed by contacting a wiping member to the surface of the slave medium or by air blowing while rotating the slave medium. A ninth step is a verifying step for checking the servo signals transferred to the slave medium, in which the magnetic recording medium is mounted on a drive, and the servo signals or the like recorded in the slave medium are read out by accessing the magnetic head, thus checking signal quality. A tenth step is a packing step for packing a product, in which the magnetic recording medium is packed by a packing machine so as to be shipped, thus completing the manufacture of the magnetic recording medium.

An outline of the magnetic transfer step is shown in FIGS. 6A to 6C. First, as shown in FIG. 6A, an initial magnetic field Hin is applied to a slave medium 2 in a direction along a track, and the slave medium 2 is previously subjected to DC magnetization (DC demagnetization). Thereafter, as shown in 6B, a magnetic transfer surface of the slave medium 2 is brought into close contact with an information bearing surface in which an micro uneven pattern of a substrate 31 of a master medium 3 is covered with a magnetic layer 32. Transfer magnetic field Hdu is applied to the master medium 3 and the slave medium 2 in a direction reverse to the initial magnetic field Hin along the track of the slave medium 2. Thus, the magnetic transfer is performed. As a result, as shown in FIG. 6C, information of the master medium 3 is magnetically transferred to the magnetic transfer surface (track) of the slave medium 2 to be recorded. The information corresponds to the pattern formed by concave spaces and protrusion portions of the magnetic layer 32 on the information bearing surface of the master medium 3.

Noted that even when the uneven pattern formed on the substrate 31 of the master medium 3 is a negative uneven pattern reverse to the positive pattern shown in FIG. 6B, the same information as that in the above can be magnetically transferred and recorded by making a direction of the initial magnetic field Hin and a direction of the transfer magnetic field Hdu reverse to those in the above. When the substrate 31 is a ferromagnetic material, composed of Ni or the like, the magnetic transfer can be performed using only the substrate 31, and it is unnecessary to cover the substrate 31 with the foregoing magnetic layer 32 (soft magnetic layer). However, a good magnetic transfer can be achieved by providing the magnetic layer 32 having excellent transfer properties. When the substrate 31 is made of nonmagnetic substance, it is necessary to provide the magnetic layer 32 on the substrate 31.

When the substrate 31 made of a ferromagnetic metal is covered with the magnetic layer 32, a nonmagnetic layer should be provided between the substrate 31 and the magnetic layer 32 in order to shield against the influence of magnetism of the substrate 31. Furthermore, a protection film such as diamond-like carbon (DLC) may be provided on the uppermost layer. The protection film enhances resistance to contact, and the magnetic transfer can be performed many times. An Si film may be formed under the DLC protection film by sputtering or the like.

Furthermore, when the magnetic transfer is performed for both surfaces of the slave medium 2, there are the following two methods. One is that the magnetic transfer is performed for one surface of the slave medium 2 and then for the other surface thereof in different steps. The other is that the master medium 3 is allowed to be brought into close contact with each side of the slave medium 2, and the magnetic transfer is simultaneously performed for both sides of the slave medium 2.

Figure 2:
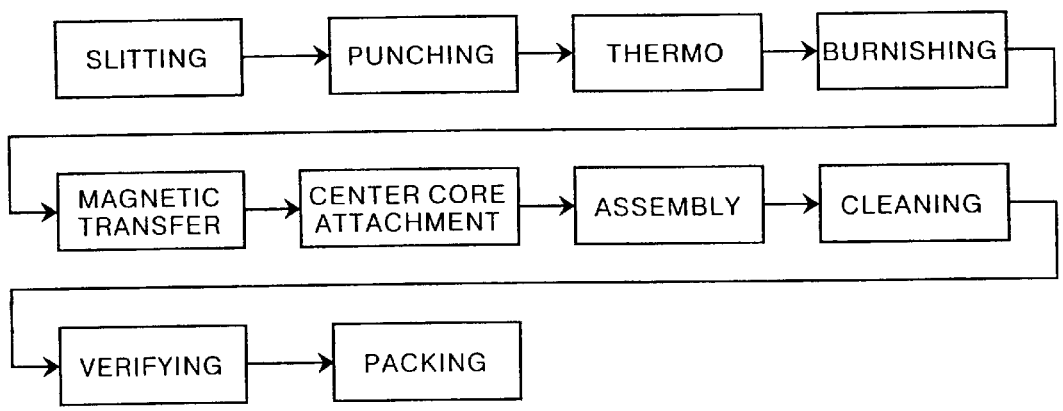
FIG. 2 is a diagram showing a flow of manufacturing steps for manufacturing a magnetic recording medium according to a second embodiment of the present invention.

FIG. 2 shows manufacturing steps for manufacturing a magnetic recording medium according to the second embodiment of the present invention in order. A first step is the slitting step for cutting the original sheet into the discrete webs each having a predetermined width. A second step is the punching step for obtaining the disc-shaped slave medium by punching the web. A third step is the thermo step for removing distortion of the slave medium and for promoting hardening of the slave medium. A fourth step is the burnishing step for smoothing the surface of the slave medium. These steps are the same as those in the first embodiment. A fifth step is the magnetic transfer step for performing the magnetic transfer by allowing the slave medium and the master medium bearing the servo information to be brought into close contact with each other. A sixth step is the center core attachment step for fixedly attaching the center core to the slave medium after the magnetic transfer. A seventh step is the assembly step for incorporating the slave medium into the case. An eighth step is the cleaning step for removing dust on the slave medium after assembly. A ninth step is the verifying step for checking the servo signals transferred to the slave medium. A tenth step is the packing step for packing the magnetic recording medium as a product.

The second embodiment differs from the first embodiment in that the magnetic transfer is performed for the slave medium having no center core and the center core is attached to the slave medium after the magnetic transferred is performed.

Figure 3:
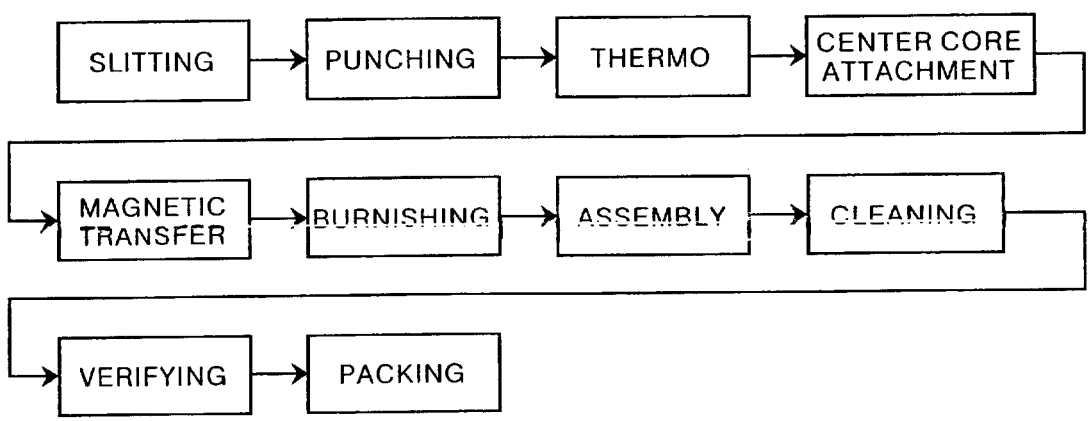
FIG. 3 is a diagram showing a flow of manufacturing steps for manufacturing a magnetic recording medium according to a third embodiment of the present invention.

FIG. 3 shows manufacturing steps for manufacturing a magnetic recording medium according to the third embodiment of the present invention in order. A first step is the slitting step for cutting the original sheet into the discrete webs each having a predetermined width. A second step is the punching step for obtaining the disc-shaped slave medium by punching the web. A third step is the thermo step for removing distortion of the slave medium. A fourth step is the center core attachment step for fixedly attaching the center core to the slave medium. A fifth step is the magnetic transfer step for performing the magnetic transfer by allowing the slave medium and the master medium bearing the servo information to be closely in contact with each other. A sixth step is the burnishing step for smoothing the surface of the slave medium after the magnetic transfer. A seventh step is the assembly step for incorporating the slave medium into the case. An eighth step is the cleaning step for removing dusts on the slave medium after assembly. A ninth step is the verifying step for checking the servo signals transferred to the slave medium. A tenth step is the packing step for packing the magnetic recording medium as a product.

The third embodiment differs from the first embodiment in that the burnishing step is performed after the magnetic transfer step.

Figure 4:
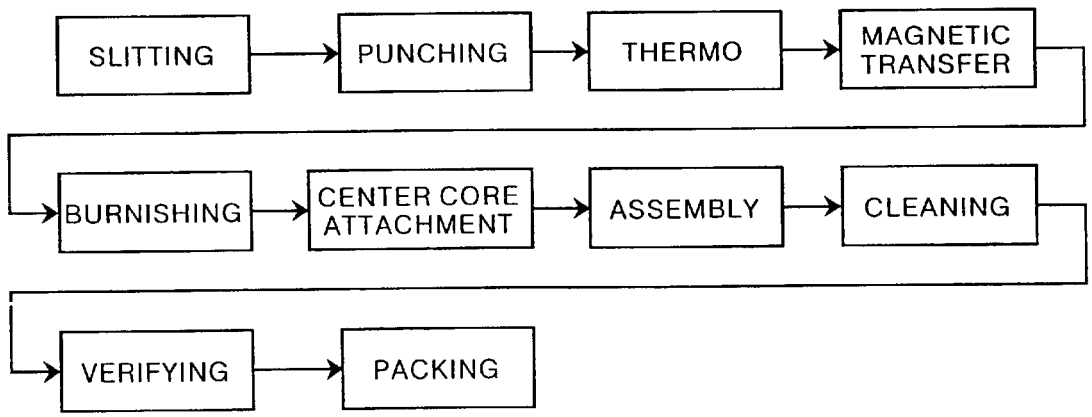
FIG. 4 is a diagram showing a flow of manufacturing steps for manufacturing a magnetic recording medium according to a fourth embodiment of the present invention.

FIG. 4 shows manufacturing steps for manufacturing a magnetic recording medium according to a fourth embodiment of the present invention in order. A first step is the slitting step for cutting the original sheet into the discrete webs each having a predetermined width. A second step is the punching step for obtaining the disc-shaped slave medium by punching the web. A third step is the thermo step for removing distortion of the slave medium and for promoting hardening of the slave medium. A fourth step is the magnetic transfer step for performing the magnetic transfer by allowing the slave medium and the master medium bearing the servo information to be brought into close contact with each other. A fifth step is the burnishing step for smoothing the surface of the slave medium after the magnetic transfer. The sixth step is the center core attachment step for fixedly attaching the center core to the slave medium. A seventh step is the assembly step for incorporating the slave medium into the case. An eighth step is the cleaning step for removing dust on the slave medium after assembly. A ninth step is the verifying step for checking the servo signals transferred to the slave medium. A tenth step is the packing step for packing the magnetic recording medium as a product.

The fourth embodiment differs from the third embodiment in that the magnetic transfer is performed for the slave medium having no center core and the center core is attached to the slave medium after the magnetic transfer similarly to the second embodiment, and differs from the first and second embodiments in that the burnishing step is performed after the magnetic transfer step.

Figure 5:
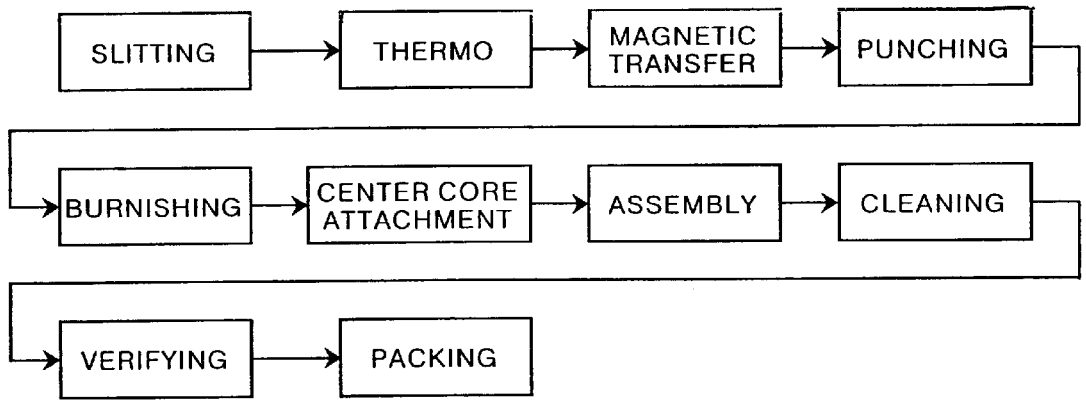
FIG. 5 is a diagram showing a flow of manufacturing steps for manufacturing a magnetic recording medium according to a fifth embodiment of the present invention.

FIG. 5 shows manufacturing steps for manufacturing a magnetic recording medium according to the fifth embodiment of the present invention in order. A first step is the slitting step for cutting the original sheet into the discrete webs each having a predetermined width. A second step is the thermo step for removing distortion of the slave medium and for promoting hardening of the slave medium. A third step is the magnetic transfer step for performing the magnetic transfer by allowing the web and the master medium bearing the servo information to be brought into close contact with each other. A fourth step is the punching step for obtaining the disc-shaped slave medium by punching the web after the magnetic transfer, in which the web is punched so that a center of the magnetic transfer is coincident with a center of the slave medium. A fifth step is the burnishing step for smoothing the surface of the slave medium. The sixth step is the center core attachment step for fixedly attaching the center core to the slave medium. A seventh step is the assembly step for incorporating the slave medium into the case. An eighth step is the cleaning step for removing dusts on the slave medium after assembly. A ninth step is the verifying step for checking the servo signals transferred to the slave medium. A tenth step is the packing step for packing the magnetic recording medium as a product.

The fifth embodiment differs from the first to fourth embodiments in that the magnetic transfer step is performed before the punching step. In this case, accuracy of the punching position corresponding to a position of the magnetic transfer and accuracy of the attaching position of the center core are required.

On the contrary, in the first and third embodiments in which the magnetic transfer step is performed after the center core is attached to the slave medium obtained in the punching step, accuracy of the position of the magnetic transfer coincident with the position of the center core is required. In the second and fourth embodiments in which the center core is attached to the slave medium after the magnetic transfer is performed for the slave medium obtained by the punching step, accuracy of the attaching position of the center core corresponding to the position of the magnetic transfer is required.

On the other hand, the first and second embodiments in which the burnishing step is performed before the magnetic transfer step are effective when micro protrusions having influences on the magnetic transfer exist in the surface of the slave medium. Specifically, the micro protrusions are removed in the burnishing step to increase smoothness of the surface of the slave medium and then the magnetic transfer is performed. At this time, the magnetic transfer step must be performed after removing dust generated in the burnishing step. In the third to fifth embodiments in which the burnishing step is performed after the magnetic transfer step, the burnishing step in which dust is apt to be generated is performed after the magnetic transfer step when smoothness of the surface of the slave medium is secured in the magnetic transfer step, and thus it is possible to control the occurrence of so-called signal missing due to insufficient contact because of intervention of dust between the master medium and the slave medium. Note that an increase in the smoothness of the surface of the slave medium makes it possible to reduce shock to be applied to the magnetic head in recording/reproducing information.

The preparation of the master medium 3 in the magnetic transfer shown in FIG. 6 will be described as follows. As the substrate 31 of the master medium 3, nickel, silicon, quartz plate, glass, aluminum, an alloy, ceramics, synthetic resin and the like are used. The formation of the uneven pattern is performed by a stamper method, a photo-fabrication method or the like. The stamper method is performed in the following manner. A laser beam or an electron beam, which is modulated in accordance with the servo signal, is radiated onto photoresist provided on a glass plate or a quartz plate for exposure. An original disc having an uneven shape of the photoresist is obtained by removing the exposed portions. Subsequently, plating or electroforming is performed for the surface of the original disc, and a substrate having an uneven pattern is prepared and peeled off from the original disc. Then, the substrate is used as the master medium intactly, or used as the master medium after a nonmagnetic layer, a soft magnetic layer or a protection film has been coated on the uneven pattern if necessary. Alternatively, a second original disc having an inverted uneven pattern may be prepared by performing plating for the original disc, and the substrate may be prepared by use of the second original disc. In addition, the substrate may be prepared by use of a third original disc having an uneven pattern obtained by inverting the pattern of the second original disc. On the other hand, photoresist patterns are formed on the foregoing glass plate, and then etching is performed. The original disc in which the photoresist is removed may be obtained, and then the substrate is formed in the foregoing manner.

As the slave medium 2, a coating type magnetic recording medium or a metal thin film magnetic recording medium is used. As the coating type magnetic recording medium, a medium on the market such as a high density flexible disc is mentioned. As to the metal thin film magnetic recording medium, Co, a Co alloy (CoPtCr, CoCr, CoPtCrTa, CoPtCrNbTa, CoCrB, CoNi and the like), Fe, an Fe alloy (FeCo, FePt and FeCoNi) can be used as a magnetic material. Since these materials have high magnetic flux densities and magnetic anisotropy in a direction identical to a direction of the magnetic field application (the direction of the magnetic field application is parallel to the surfaces of the master medium and the slave medium in the case of an intra-recording, and the direction of the magnetic field application is perpendicular to the surfaces of the master medium and the slave medium in the case of a vertical recording), these materials are preferable because a clear transfer can be performed using them. To allow a portion (supporting body side) under the magnetic material to have necessary magnetic anisotropy, a nonmagnetic base layer should be provided. This magnetic base layer needs to be matched with the magnetic material layer in a crystal structure and a lattice constant. To allow the magnetic base layer to have the same crystal structure and the same lattice constant as those of the magnetic layer, Cr, CrTi, CoCr, CrTa, CrMo, NiAl, Ru or the like is used.

What is claimed is:

1. A method of manufacturing a magnetic recording medium having a disc-shaped flexible slave medium accommodated in a case, onto which servo signals are recorded by a magnetic transfer method, comprising cutting an original sheet into discrete webs each having a predetermined width punching at least one of the webs to obtain a disc-shaped slave medium removing distortion of one of the web and the slave medium smoothing a surface of the slave medium fixedly attaching a center core to the slave medium performing a magnetic transfer in a state where a master medium bearing servo information and one of the web and the slave medium are allowed to be brought into close contact with each other incorporating the slave medium into the case removing dust on the slave medium incorporated into the case checking the servo signals magnetically transferred to the slave medium and packing the magnetic recording medium as a product wherein said cutting, said punching, and distortion removal, said smoothing, said core attachment, said magnetic transfer, said incorporation, said dust removal, said servo checking and said packing said thermo step, said burnishing step, said center core attachment step, said magnetic transfer step, said assembly step, said cleaning step, said verifying step and said packing step are performed in order.

2. The method of manufacturing a magnetic recording medium according to claim 1, wherein the magnetic transfer carried our such that the slave medium is first subjected to DC magnetization in a track direction, the slave medium is brought into close contact with the master medium for use in the magnetic transfer, on which a magnetic layer is formed in a micro uneven pattern corresponding to information to be transferred, and a transfer magnetic field is applied to the master medium and the slave medium in a direction approximately opposite to the initial DC-magnetization direction for a surface of the slave medium.

3. The method of manufacturing a magnetic recording medium according to claim 1, wherein cutting is performed using a slitter having a slit edge, and wherein said slitter slits a roll of the original sheet with a large width into discrete webs each having a predetermined width, and the webs are wound.

4. The method of manufacturing a magnetic recording medium according to claim 1, wherein said punching is performed by a press machine having a punch and a die, and wherein said press machine punches the web to obtain the disc-shaped slave medium having a hole for attaching a center core in the center thereof.

5. The method of manufacturing a magnetic recording medium according to claim 1, wherein during the distortion removal, distortion of the slave medium is removed by placing the slave medium in a constant temperature bath adjusted to a predetermined temperature.

6. The method of manufacturing a magnetic recording medium according to claim 1, wherein during said smoothing micro protrusions in a surface of the slave medium are scraped and the surface thereof is smoothed by a hard material such as a grinding head and a rotation edge, a polishing tape, a nonwoven fabric or the like, and subsequently stains and excessive lubricant on a surface of the slave medium are removed.

7. The method of manufacturing a magnetic recording medium according to claim 1, wherein during said core attachment an outer peripheral flange portion of the center core made of a metallic plate and an inner peripheral portion of the slave medium are fixedly attached to each other by an adhesive so that both centers thereof are matched with each other.

8. The method of manufacturing a magnetic recording a medium according to claim 1, during said dust removal the window portion is opened by an opening operation of a shutter, and stains such as dust adhered to the slave medium are removed by contacting a wiping member to a surface of the slave medium or by air blowing while rotating the slave medium.

9. The method of manufacturing a magnetic recording medium according to claim 1, during said servo checking the magnetic recording medium is mounted on a drive, and the servo signals or the like recorded iii the slave medium are read out by accessing a magnetic head.

* * * * *